Aug. 24, 1965   J. F. McGIVERN   3,202,900
STORAGE BATTERY OPERATING CIRCUIT
Filed June 7, 1962
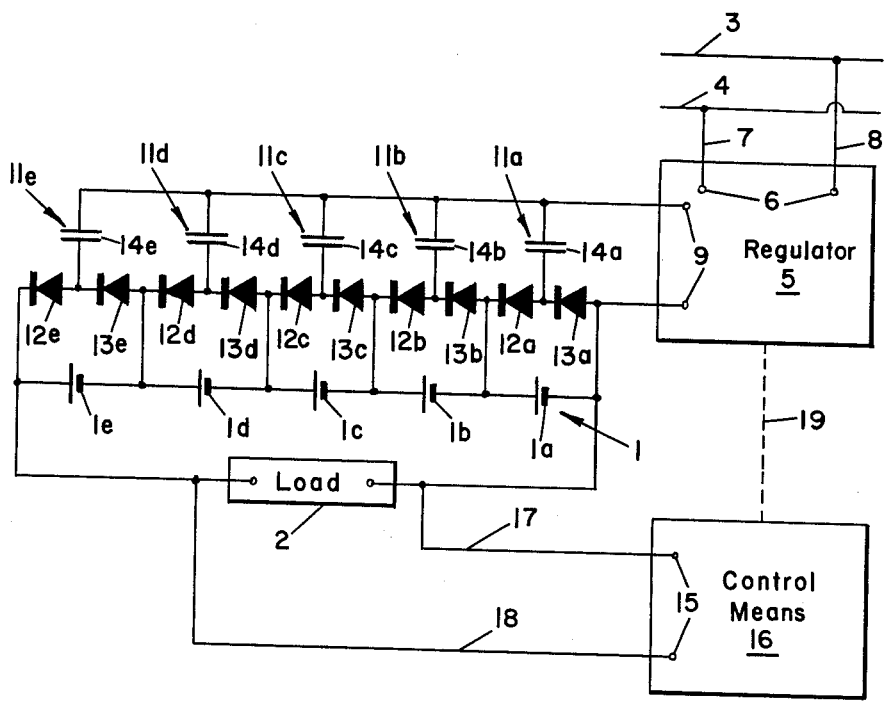

United States Patent Office 3,202,900
Patented Aug. 24, 1965

3,202,900
STORAGE BATTERY OPERATING CIRCUIT
James F. McGivern, Jr., Philadelphia, Pa., assignor to The Electric Storage Battery Company, a corporation of New Jersey
Filed June 7, 1962, Ser. No. 200,803
8 Claims. (Cl. 320—39)

The present invention generally relates to the operation of storage batteries. More specifically, the present invention is concerned with a circuit for charging batteries or battery cells on parallel and discharging them in series.

While not limited thereto the present invention is particularly adapted for the operation of storage batteries in floating service where the battery is connected across a line the voltage of which is approximately equal to the open-circuit voltage of the battery and opposite in polarity. When a battery is so connected it will be charged and discharged as the fluctuations of voltage of the line rises above or falls below the battery voltage. A battery which is properly floated on a power line will automatically regulate the power required for a fluctuating load and the battery will be maintained in the fully charged condition. Storage batteries operated on floating service are commonly utilized in electric power substations and in telephone service to insure an uninterrupted and well-regulated supply of current for the operation and control of protective equipment and to supply emergency power in the event of a failure of the outside power supply. In addition, in telephone service the batteries serve to reduce cross-talk and absorb circuit noise generated by the equipment used to transform incoming power to a form suitable for telephone service.

Batteries utilized for floating service generally employ grids of calcium-lead alloys instead of the usual antimony-lead alloys to reduce self discharge, and increase life. In addition, the absence of antimony in these cells eliminates the danger of stibine gas evolution. Calcium-lead alloy grid batteries, however, are not particularly well adapted to cycling service and overcharge conditions and, hence, their use is limited to floating service where the battery voltage is well regulated and they are not subjected to heavy cycling. It has been determined, however, that in some floating applications batteries experience a cycle which, integrated over a reasonable period of time amounts to as much as a 10% overcharge schedule computed on the basis of battery capacity. While antimony-lead alloy cells are well adapted to such service, calcium-lead alloy cells have tended to fail prematurely under such conditions. In most cases such failure has been a consequence of intergranular corrosion of the calcium-lead alloy positive grids which is associated with an apparent fall-off in battery capacity. This deterioration of calcium-lead alloy grids and the attendant capacity fall-off is generally not uniformly distributed over the cells of a battery due to non-uniformity among the cells which are amplified as a result of their operation in electrical series as a battery. Even when the overall battery voltage is regulated, some cells of a battery are subjected to more overcharge than others because of intrinsic irregularities. Such cells first exhibit an apparent fall-off capacity then an actual capacity loss which results in these cells experiencing larger voltage fluctuations due to the charging current inherent in floating systems. In this manner, overcharge conditions are aggravated and cell failure is accelerated.

An object of the present invention is to provide a new and improved circuit for operating storage batteries on floating service which will prolong the life of the battery.

Another object of the present invention is to provide a circuit for regulating the voltages of the individual cells of a battery in floating service and to thereby prevent the overcharging of the individual cells.

Still another object of the present invention is to provide a battery floating circuit in which the individual cells are maintained at a constant voltage while operating in series in an electrical circuit on a varying load when control over the battery voltage only is exercised.

A further object of the present invention is to provide a circuit which will permit the charging of individual battery cells or individual batteries in parallel and their discharge in series.

In accordance with the present invention a storage battery to be operated on floating service is connected in parallel across the load with the individual cells thereof connected through a self-filtering network to an alternating current source in such a manner that each of the cells is effectively connected in parallel to the source. The network coupling the cells of the battery to the alternating current source comprises a series of voltage doubler circuits with each cell of the battery connected as the output capacitor in each of the doubler circuits. The alternating current supply voltage is then controlled in accordance with the constancy of the voltage supplied across the load, thereby maintaining a substantially constant voltage across the individual cells of the battery. The basic circuit of the present invention, however, is also adapted for the charging of individual battery cells or individual batteries in parallel and their discharge in series whether or not the voltage regulation required by floating service is utilized to maintain control over cell or battery voltages.

A better understanding of the present invention may be had from the following description when read with reference to the accompanying drawing which is a circuit diagram of a storage battery floating circuit in accordance with the present invention.

Referring now to the drawing, the numeral 1 generally designates a battery having a plurality of cells 1a, 1b, 1c, 1d, and 1e. The battery 1 is connected in parallel across a load 2 and will supply current to the load 2 if the voltage of the supply falls below the open circuit voltage of the battery 1. The load 2 is supplied with power from a source shown here as the alternating current carrying conductors 3 and 4. The power from the conductors 3 and 4 is supplied to the load 2 through the alternating current regulator 5 which is shown schematically as having a pair of input terminals 6 connected across the conductors 3 and 4 by means of the leads 7 and 8 and as having a pair of output terminals 9. The alternating current regulator 5 in and of itself forms no part of the present invention and may comprise any conventional regulating means such as an adjustable or saturable core transformer adapted to provide a regulated alternating current across the output terminals 9.

Power is supplied to the load 2 and the battery 1 from the output terminals 9 of the regulator 5 through a plurality of coupling networks 11a, 11b, 11c, 11d and 11e which are self-filtering and rectifying. The coupling network 11a comprises a pair of diodes 12a and 13a and a capacitor 14a. The diodes 12a and 13a are connected in series across the cell 1a of the battery 1 and are poled in such a manner as to oppose the discharge of that cell therethrough and to supply a charging current thereto. The capacitor 14a is connected to the terminal 9 of the regulator 5 and to the junctions of the diodes 12a and 13a. The diode 13a and the negative terminal of the cell 1a are connected to the other terminal 9 of the regulator 5. As so connected, the cell 1a of the battery 1 is connected as the output capacitor of a voltage doubler circuit. Each of the other coupling networks 11b, 11c, 11d and 11e are similarly constructed and connected across a respective cell of the battery 1 with all of the diodes thereof connected in series. Accordingly, similar reference numerals with appropriate letter subscripts have been utilized to designate the components of these networks.

The voltage across the load 2 is applied across the input terminals 15 of a control means 16 by means of the conductors 17 and 18. Like the regulator 5, the control means 16 in and of itself forms no part of the present invention and may be any form of voltage sensitive control apparatus such as a self-balancing potentiometer which is operative to adjust the output voltage of the regulator 5 in accordance with the voltage across the load 2 to maintain it constant. The means for effecting control of output of the regulator 5 is shown diagramatically by the dotted line 19.

In considering the operation of the battery floating circuit of the present invention it should be understood that the output voltage of the regulator 5 is adjusted to supply a normal voltage across the terminals of the battery 1 and the load 2 approximately equal to the open circuit voltage of the battery. Under such conditions, the battery will be charged or discharged as this voltage rises above or falls below the battery voltage. In this respect, the coupling networks 11 are halfwave rectifying circuits supplying a unidirectional voltage across the battery 1 through the capacitors 14 and the diodes 12 during the half cycle of the supply voltage that the output terminal of the regulator 5 which is connected to the capacitors 14 is positive with respect to the other output terminal of the regulator 5. The coupling networks 11 are self-filtering due to the capacitors 14 and the capacitance of the battery 1. It should be noted that the actual voltage applied across each cell is subject to the voltage drop across the diodes. Accordingly, it may be desirable to utilize trimming resistors in series with the diodes or matched components to assure that the voltages across each of the cells of the battery are equal. In addition, inasmuch as the coupling networks 11 are voltage doublers the peak value of the output voltage of the regulator 5, disregarding the voltage drop across the circuit diodes, should be nominally one-half the open circuit voltage of one cell of the battery 1. The doubling action of the coupling networks 11 is achieved by the charging of the capacitors 14 during the half cycle of the supply voltage during which the terminal 9 of the voltage regulator 5 connected to the diodes is positive with respect to the other terminal 9. This voltage is added to the charging voltage during the next half cycle. It should be noted that the voltage across the capacitors 14 in the networks 11 coupling succeeding battery cells to the output terminals 9 of the regulator 5 increases as the number of battery cells increase.

By virtue of coupling networks employed in the floating circuit of the present invention each of the cells of the battery 1 is effectively connected in parallel across the supply while operating in series in supplying current to the load. Thus, if the supply voltage is well regulated the voltage across each of the cells of the battery will be regulated. Since regulation of each of the cell voltages has been found to be desirable in preventing premature deterioration of batteries on floating service the voltage across the load may be utilized as shown to regulate the supply voltage. In this regard it should be noted that any means of providing regulated supply may be employed within the scope of the present invention since the voltage across the cells will be substantially equal to the peak voltage of the supply and not a voltage determined by the conditions of the individual cells. As noted hereinbefore, this means of operating a battery on floating service will prevent an amplification of non-uniformity among the cells which may lead to an aggravation of an inherent weakness in one or more of the cells of the floating battery.

In further considering the coupling network of the present invention it should be noted that while regulation of individual cell voltage and battery voltage is extremely important when a battery is operated on float service, that the circuit of the present invention is also adapted for the charging not only of individual cells in parallel, but also individual batteries in parallel where they are to be discharged in series and provides a means for accomplishing such a mode of operation. For such service the regulation of the supply in accordance with the control voltage may or may not be necessary depending upon the particular application. Referring again to the drawing it should be noted that for this application the battery 1 would consist of a number of individual batteries or cells as the case may be. Thus, in this application the cells 1a through 1e may be replaced with individual batteries each having one or more cells.

Having described the present invention, that which is claimed as new is:

1. In combination, a pair of input terminals adapted to be connected to a source of alternating current, a battery having a plurality of cells and a pair of terminals adapted to be connected to a load, a plurality of series connected pairs of diodes, each of said pairs of diodes being connected across a respective one of the cells of said battery, and a plurality of capacitors, each of said capacitors being connected between one of said input terminals and a respective one of the junctions of said diodes of said series connected pairs of diodes, all of said diodes being connected in series to the other of said input terminals and poled to supply a charging current to said battery.

2. In combination, a pair of input terminals adapted to be connected to a source of alternating current, regulating means having a pair of input terminals connected to said aforementioned input terminals and a pair of output terminals, a load, a battery having a plurality of cells and a pair of terminals connected across said load, a plurality of series connected pairs of diodes, each of said pair of diodes being connected across a respective one of the cells of said battery, a plurality of capacitors each of said capacitors being connected between one of said regulating means output terminals and a respective one of the junction of said diodes of said series connected pairs of diodes, all of said diodes being connected in series to the other of said regulating means output terminals and poled to supply charging current to said battery and control means connected to said load to control the voltage across said regulating means output terminals in accordance with the voltage across said load.

3. A circuit for operating a storage battery on floating service across a load comprising a storage battery adapted to be connected across said load, said battery having a plurality of cells, a pair of input terminals, and a plurality of coupling networks, each connecting one of said cells to said input terminals, said coupling networks each comprising a pair of diodes connected in series and a capacitor connected to the junction of said diodes, said diodes being connected across the respective battery cell, said capacitor being connected to one of said input terminals, said diodes in all of said networks being connected in series to the other of said input terminals and poled to oppose battery discharge throughout.

4. A circuit for operating a storage battery on floating service across a load comprising regulating means having a pair of input terminals and a pair of output terminals, the input terminals of said regulating means being adapted to be connected to a suitable source of alternating current, a storage battery having a plurality of cells adapted to be connected across said load, said storage battery having a plurality of coupling networks each connecting one of said cells to said regulating means output terminals, said coupling networks each comprising a pair of diodes connected in series and a capacitor connected to the junction of said diodes, said diodes being connected across the respective battery cell, said capacitor being connected to one of said regulating means output terminals, said diodes in all of said networks being connected in series to the other of said regulating means output terminals and poled to oppose battery discharge throughout and control means connected to said load to control the voltage across said regulating means output terminals in accordance with the voltage across said load.

5. A circuit for operating a storage battery on floating service across a load comprising, in combination, a storage battery adapted to be connected across said load, said battery having a plurality of cells, a pair of circuit input terminals, and a plurality of voltage doubler networks one for each of the cells of said battery, each of said voltage doubler networks having an input and an output, the input of each of said voltage doubler circuits being connected in parallel across said circuit input terminals, the output of each of said voltage doubler circuits being connected across a respective one of the cells of said battery.

6. A circuit for operating a storage battery on floating service across a load comprising, in combination, regulating means having a pair of input terminals and a pair of output terminals, the input terminals of said regulating means being adapted to be connected to a suitable source of alternating current, a storage battery adapted to be connected across said load, said battery having a plurality of cells, a plurality of voltage doubler networks one for each of the cells of said battery, each of said voltage doubler networks having an input and an output, the input of each of said voltage doubler circuits being connected in parallel across the output terminals of said regulating means, the output of each of said voltage doubler circuits being connected across a respective one of the cells of said battery, and control means adapted to be connected to said load to control the voltage across the output terminals of said regulating means in accordance with the voltage across said load.

7. In combination, a pair of input terminals adapted to be connected to a source of alternating current, a plurality of batteries connected in series, a plurality of series connected pairs of diodes, each of said pairs of diodes being connected across a respective one of said batteries, and a plurality of capacitors, each of said capacitors being connected between one of said input terminals and a respective one of the junctions of said series connected pairs of diodes, all of said diodes being connected in series to the other of said input terminals and poled to supply a charging current to said batteries.

8. A storage battery operating circuit comprising a plurality of batteries connected in series, a pair of circuit input terminals, and a plurality of voltage doubler networks one for each of said plurality of batteries, each of said voltage doubler networks having an input and an output, the input of each of said voltage doubler circuits being connected in parallel across said circuit input terminals, the output of each of said voltage doubler circuits being connected across a respective one of said plurality of batteries.

References Cited by the Examiner
UNITED STATES PATENTS 2,838,727   6/58   Boyer _____ 320—6 X
2,880,306   3/59   Witte _____ 320—53 X

OTHER REFERENCES

"Radio Amateurs' Worksheet," CQ, June, 1945, pages 27 and 28 relied on. (Copy in 321–15, Division 71.)

Harvey: "Battery Charges and Charging," London, 1953 (page 177 relied on). (Copy in Division 71 and Scientific Library QC 603H25.)

Malloy: "Radio and Television Engineers' Reference Book," Sec. 25–25, 1954.

LLOYD McCOLLUM, *Primary Examiner.*